Nov. 27, 1923
C. W. RIPSCH
TRAILER JACK
Filed Nov. 19, 1919  2 Sheets-Sheet 1
1,475,598
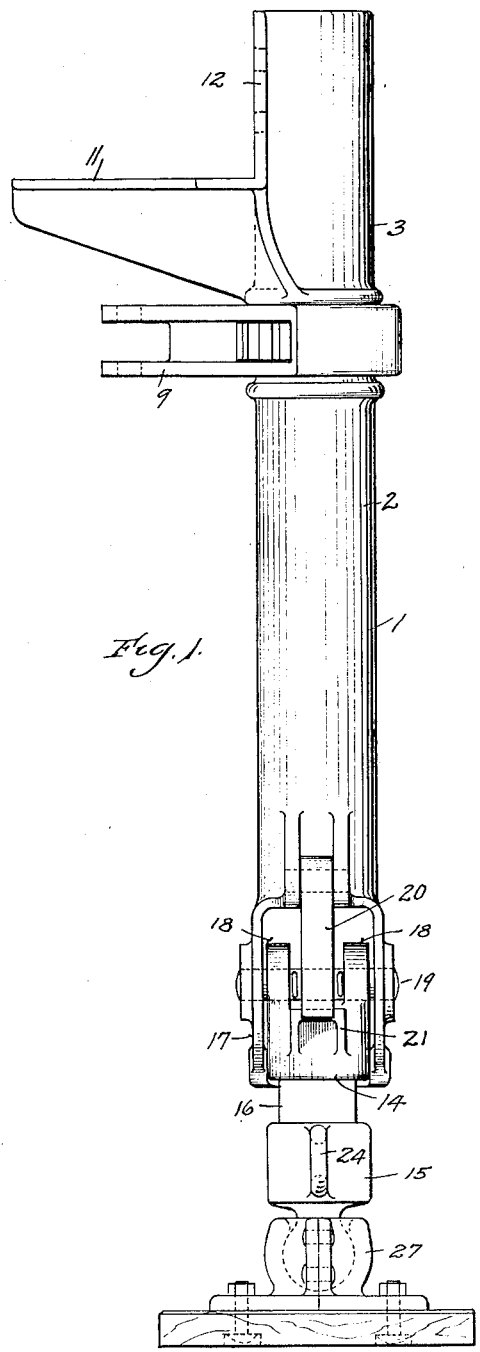
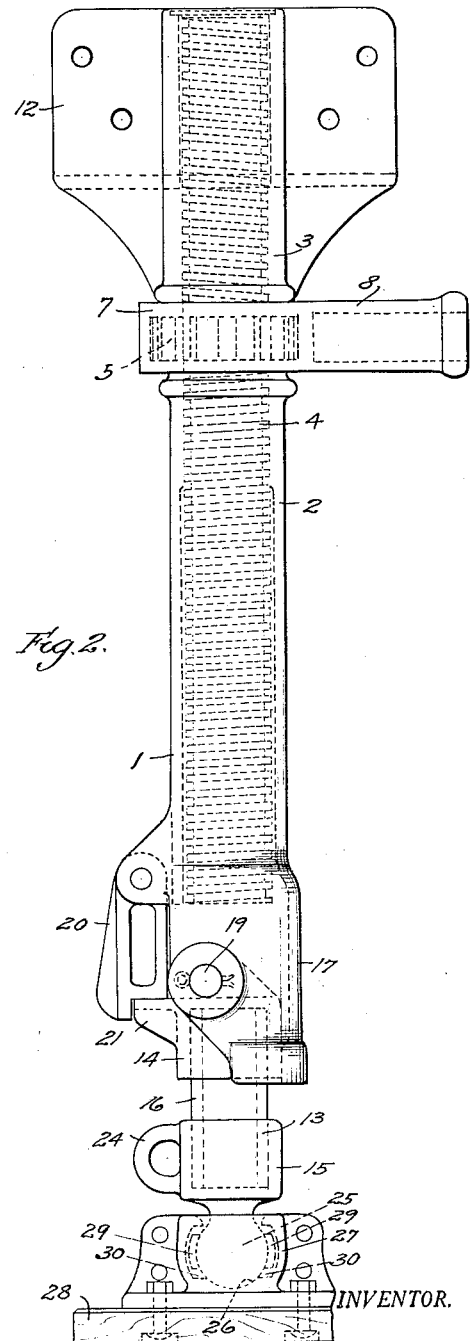
INVENTOR.
BY Charles W. Ripsch
Conrad Reid ATTORNEY.

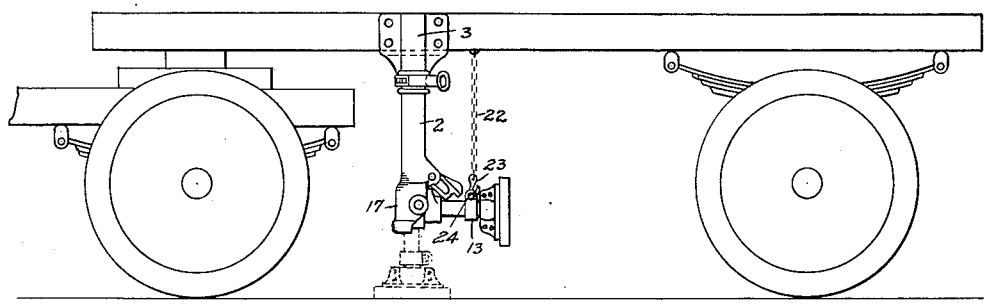
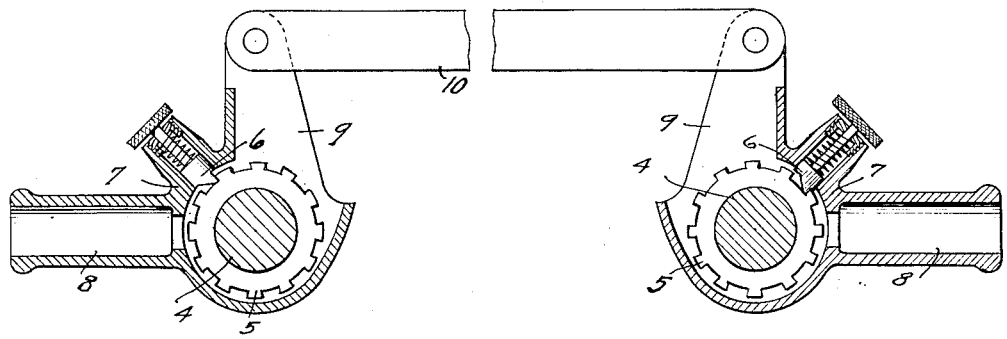

Patented Nov. 27, 1923.

1,475,598

UNITED STATES PATENT OFFICE.

CHARLES W. RIPSCH, OF DAYTON, OHIO, ASSIGNOR TO THE JOYCE-CRIDLAND COMPANY, OF DAYTON, OHIO, A CORPORATION OF OHIO.

TRAILER JACK.

Application filed November 19, 1919. Serial No. 339,135.

*To all whom it may concern:*

Be it known that I, CHARLES W. RIPSCH, a citizen of the United States, residing at Dayton, in the county of Montgomery and State of Ohio, have invented certain new and useful Improvements in Trailer Jacks, of which the following is a specification, reference being had therein to the accompanying drawing.

This invention relates to supporting devices for two wheeled trailers and the like.

Two wheeled trailers such as are commonly used with automobile trucks are provided with wheels at the rear end only and the front end is supported in and connected with the rear end of the motor truck. In order that the loaded trailer may be connected with, or disconnected from, the truck it is necessary to provide some means for supporting the forward end of the trailer independently of the truck and for raising and lowering the forward end of the trailer. Lifting jacks of various constructions are commonly used for this purpose, and the object of the present invention is to provide a lifting jack adapted to be connected with the frame of the trailer and having its lower part so connected therewith that it can be moved into an inoperative position when not in use, and which will be provided with means for preventing dirt or foreign matter from interfering with the movements of this lower member of the jack.

It is also an object of the invention to provide a device of this character which will be very simple in its construction and operation and which will be of a strong and durable character.

Other objects of the invention will appear as the mechanism is described in detail.

In the accompanying drawings Fig. 1 is a rear elevation of a jack embodying my invention; Fig. 2 is a side elevation of same; Fig. 3 is a side elevation of a trailer showing my jack attached thereto; and Fig. 4 is a horizontal sectional view taken through the two jacks showing the mechanism for operating them in unison.

In these drawings I have illustrated one embodiment of my invention and have shown the same as comprising a jack constituting upper and lower members pivotally connected one to the other, the upper member being rigidly secured to the frame of the trailer and the lower member being adapted to rest upon the ground when it is in alinement with the upper member. One of these members is extensible and is provided with means for operating the same to raise and lower the forward end of the trailer with relation to the truck. In the present construction the upper member has been made extensible but it will be understood that this is not essential to the invention. I do not claim to be the first to have provided a jack for a trailer having a part which may be moved into an inoperative position, but I have made certain important improvements in such a jack and these improvements may be embodied in jacks of various kinds embodying the essential features of construction above described, the jack construction here illustrated having been chosen for the purpose of illustration only.

In that form of the device here illustrated the jack comprises an upper member, 1, consisting of two tubular portions, 2 and 3, which are provided with internal screw threads to receive the respective end portions of the screw 4, the respective end portions of the screw having right and left hand threads so that the rotation of the same will move the two parts of this member of the device toward or away from one another, thus either extending or contracting the jack. Rotary movement may be imparted to the screw in any suitable manner and as here shown it has secured thereto a toothed wheel 5 with which cooperates a pawl 6. This pawl may be operated in any suitable manner and I have, in the present construction, shown it slidably mounted in a housing 7 which embraces the toothed wheel 5 and is rotatably mounted about the axis of the screw. The housing is provided with a lever socket 8 to receive a bar for rotating the screw. The jacks are usually used in pairs, one being attached to each side of the trailer frame and it is desirable that means should be provided whereby the two jacks may be extended or contracted simultaneously thus raising or lowering both sides of the trailer frame at the same time.

To this end I have provided the housing 7, which carries the pawl 6, with arms 9, which are connected one to the other by a connecting bar or link 10. Consequently when the lever of either jack is manipulated the same movement will be imparted to both jacks.

The upper member 1 of the jack may be provided at its upper ends with any suitable means for attaching the same to the trailer. As here shown it is provided with a head portion having flanges 11 and 12 to engage the bottom and side of the frame member of the trailer, to which it may be attached by bolts or screws.

Pivotally connected with the lower end of the upper member of the device is a lower member 13, which is adapted to be moved either into an operative position in alinement with the upper member or into an inoperative position at an angle to the upper member. This lower member may be of any suitable construction but as it is desirable that it should be of such a character that it can be readily manufactured in different lengths, to accommodate the jack to trailers of different heights I have shown the same as comprising two castings, 14 and 15, having sockets to receive the respective ends of a pipe section 16, which is rigidly secured therein, and which obviously may be cut to any desired length. The upper casing 14 is pivotally connected with the lower end of the upper member in any suitable manner. However the arrangement of the jacks with relation to the truck wheels is such that the wheels throw and squash mud, oily dirt and foreign matter of various kinds against the jack, when the truck and trailer are in movement over the road, and it is important that the pivotal connection be of such a character and be so guarded that this dirt will not enter the joint or accumulate on the parts thereof in such a manner as to interfere with its operation. In order to provide a pivotal connection which will not only be of a strong, durable character but will be effectually guarded against mud and the like, I have provided the lower end of upper member 1 with a downwardly extending portion 17 which is hollow, or tubular, in form and which has one side open, as is shown in Fig. 1. This tubular portion is preferably of a diameter somewhat greater than the diameter of the tubular part 2 of the upper member and is adapted to receive the upper end casting 14 of the lower member 13. The casting 14 is provided with pivot lugs 18 having openings adapted to register with openings in the side walls of the tubular portion 17, which side walls constitute bearing lugs. A pivot pin 19 extends through the two sets of lugs and serves to pivotally connect the two parts, one with the other. It will be noted that the front and side walls of the tubular member 17 extend beyond the axis of the pivotal connection and overlap the upper end of the lower member 13 for a considerable distance. These walls completely enclose the connection on the side adjacent to the driving wheels of the truck and serve very effectually to exclude therefrom the mud and dirt thrown or splashed by these wheels. The length of the tubular portion 17 is such that when the lower member 13 is in its inoperative position, as shown in Fig. 3, no part of the casting 14 will extend below the edge of the tubular portion, or guard 17. When the two members of the device are in alined, or operative, positions the lower end of the guard, or tubular portion 17 will engage the side of the member 13 and tend to brace and stiffen the connection between the two members.

It is desirable that some means be provided for firmly holding the two members of the device in their operative position, that is, from preventing the lower portion 13 from turning about its axis when the jack is in use. To accomplish this I have pivotally mounted upon the upper member, 1 a gravity dog 20, the lower end of which will drop into engagement when a laterally extending lug 21, carried by the end casting 14 of the lower member 13, when the two members of the jack are in alinement, and will firmly lock the lower member in its operative position. When the lower member is to be restored to its inoperative position the dog 20 is moved out of engagement with the lug 21 and the member 13 swung upward into the full line position of Fig. 3 where it may be secured in any suitable manner. In the present instance I have shown a chain 22 depending from the frame of the trailer and having at its lower end a hook 23 adapted to enter an eye 24 on the lower casting 15 of the member 13.

The lower member 13 of the jack may be rigid throughout its length and may rest directly upon the ground if so desired but I prefer to provide the same with a relatively broad surface which will automatically accommodate itself to any irregularities in the road bed or other supporting surface. I have therefore provided the lower casting 15 of the member 13 with a ball 25 which is rigidly secured thereto and is adapted to enter a socket 26 formed in a two part casting 27 which forms part of the base member. This casing is rigidly secured, by means of bolts or otherwise to a block of wood or the like, 28, which rests upon the supporting surface when the jack is in use. In order to control the movement of the base with relation to the jack I have provided the ball 25 with laterally extending lugs 29 which extend into elongated grooves 30 formed in the walls of the socket 26, and preferably arranged at the joint between the two parts of the casing 27.

The construction and operation of the jack will be readily understood from the foregoing description of the several parts thereof and it will be apparent that I have provided a jack of this kind which is very simple in its construction and of a strong, durable character; and further that the jack is so constructed that a portion thereof may be moved into an inoperative position when the jack is not in use and that the joint or connection between the two parts of the jack is fully protected against the entrance of dirt and the like when the trailer is in motion; and further, that I have provided a very strong, easily operated device to lock the movable part of the jack in its operative position.

While I have shown and described one embodiment of my invention I wish it to be understood that I do not desire to be limited to the details thereof as various modifications may occur to one skilled in the art.

Having now fully described my invention what I claim as new and desire to secure by Letters Patent is:

1. In a device of the character described, an upper member comprising two tubular portions having respectively right and left hand internal threads, a screw having threaded end portions to cooperate with the threads of the respective tubular portions, means for rotating said screw, one of said tubular portions having means for attaching the same to the structure to be supported, a lower member pivotally connected to the lower end of the other tubular part for movement into and out of alinement therewith, and a guard carried by said lower tubular part and overlapping the upper end of said lower member.

2. In a device of the character described, an upper member comprising two tubular portions having respectively right and left hand internal threads, a screw having end portions threaded to cooperate with the threads of the respective tubular portions, means for rotating said screw, means for connecting the upper tubular portion with a structure to be supported, the lower tubular portion having at its lower end a tubular extension open on one side, a lower member having its upper end extending into said lower portion and pivotally mounted therein, a dog pivotally mounted on said upper member to engage said lower member and hold the same in alinement with said upper member, and a base pivotally connected with said lower member.

3. In a semi-trailer jack, the combination with a jack structure secured to a vehicle frame and adapted to be extended and retracted, a hinge formed in said jack structure, said hinge having a protecting flange forwardly thereof, and a jack leg swung from said hinge so as to flex rearwardly.

4. In a semi-trailer jack, the combination with a jack structure secured to a vehicle frame and adapted to be extended and retracted, a hinge formed in said jack structure, said hinge having a flange forwardly thereof, and a jack leg swung from said hinge so as to flex rearwardly, and means for locking said leg in vertical dependent position from said jack.

5. In a semi-trailer jack, the combination with a jack structure secured to a vehicle frame and adapted to be extended and retracted, a hinge formed in said jack structure, said hinge having a flange forwardly thereof, and a jack leg swung from said hinge so as to flex rearwardly, said means comprising a lug on the leg and a pawl on the jack adapted to swing into position to engage and prevent upward movement of said lug, said flange adapted to prevent flexing of said leg.

6. In a semi-trailer jack, the combination with a jack structure secured to a vehicle frame and adapted to be extended and retracted, a hinge formed in said jack structure, said hinge having a flange forwardly thereof, and a jack leg swung from said hinge so as to flex rearwardly, said flange being adapted to prevent forward flexing of the leg and said hinge being located on the opposite side of the central axis of said jack, from the said flange.

7. In a semi-trailer jack, the combination with a jack structure secured to a vehicle frame and adapted to be extended and retracted, a hinge formed in said jack structure, said hinge having a flange forwardly thereof, and a jack leg swung from said hinge so as to flex rearwardly, said flange preventing forward flexing, and means comprising a lug on the leg, and a pawl on the jack adapted to swing into position to engage and prevent upward movement of said lug, with the jack pivot being located on the opposite side of the central axis of the jack from said flange, whereby among other things, the withdrawal of the pawl will permit the lug on the leg to swing to a position to prevent reengagement of the pawl.

8. In a semi-trailer jack, the combination with a jack structure secured vertically to a vehicle frame and adapted to be extended and retracted, a hinge formed in said jack structure, said hinge having a flange forwardly thereof, and a jack leg swung from said hinge to flex away from said flange, and locking means for retaining the jack leg in position of abutment against said flange, whereby said leg is maintained tightly in a vertical position.

9. In a semi-trailer jack, the combination with a jack structure secured vertically to a vehicle frame and adapted to be extended and retracted, a hinge formed in said jack structure, said hinge having a flange forwardly thereof and a jack leg swung from said hinge to flex away from said flange, and locking means for retaining the jack leg in position of abutment against said flange, said hinge having a center located out of the axial line of the jack and on the opposite side of said axis from the flange, for the purpose described.

In testimony whereof, I affix my signature hereto.

CHARLES W. RIPSCH.